(12) United States Patent
Farouz-Fouquet

(10) Patent No.: US 11,027,820 B2
(45) Date of Patent: Jun. 8, 2021

(54) WING COMPRISING A LEADING EDGE SLAT AND HAVING MEANS FOR PREVENTING THE TRANSITION TO A TURBULENT BOUNDARY LAYER

(71) Applicant: Airbus Operations SAS, Toulouse (FR)

(72) Inventor: Mathias Farouz-Fouquet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 324 days.

(21) Appl. No.: 16/180,194

(22) Filed: Nov. 5, 2018

(65) Prior Publication Data

US 2019/0135409 A1 May 9, 2019

(30) Foreign Application Priority Data

Nov. 9, 2017 (FR) ........................ 1760557

(51) Int. Cl.
*B64C 9/24* (2006.01)
*B64C 21/06* (2006.01)
(Continued)

(52) U.S. Cl.
CPC .............. *B64C 9/24* (2013.01); *B64C 21/06* (2013.01); *B64C 3/28* (2013.01); *B64C 2003/143* (2013.01); *B64C 2003/146* (2013.01)

(58) Field of Classification Search
CPC combination set(s) only.
See application file for complete search history.

(56) References Cited

U.S. PATENT DOCUMENTS

2007/0221788 A1    9/2007  Meister
2007/0241236 A1*  10/2007  Whitehouse .............. B64C 9/24
                                                         244/214
(Continued)

FOREIGN PATENT DOCUMENTS

FR         964101 A       8/1950
FR        1311826 A      12/1962
(Continued)

OTHER PUBLICATIONS

French Search Report; priority document.

*Primary Examiner* — Joshua J Michener
*Assistant Examiner* — Cindi M Curry
(74) *Attorney, Agent, or Firm* — Greer, Burns & Crain, Ltd.

(57) ABSTRACT

A wing comprising a fixed main part and a leading edge slat with upper and lower surface rear edges. The wing main part has an upper surface wall, which extends downstream and in alignment with the upper surface rear edge, and a lower surface wall, which extends downstream and in alignment with the lower surface rear edge. The wing has an upper surface gap between the end of the upper surface rear edge and the end of the upper surface wall and a lower surface gap between the end of the lower surface rear edge and the end of the lower surface wall. The wing has an upper surface channel downstream of the upper surface gap and a lower surface channel downstream of the lower surface gap. The wing comprises a suction system connected to each channel and arranged to suck the air contained in the channel.

16 Claims, 3 Drawing Sheets

(51) Int. Cl.
*B64C 3/14* (2006.01)
*B64C 3/28* (2006.01)

(56) References Cited

U.S. PATENT DOCUMENTS

| | | |
|---|---|---|
| 2009/0212165 A1 | 8/2009 | Parikh |
| 2011/0006165 A1 | 1/2011 | Ireland |
| 2016/0052621 A1 | 2/2016 | Ireland et al. |

FOREIGN PATENT DOCUMENTS

| | | |
|---|---|---|
| WO | 2005113336 A1 | 12/2005 |
| WO | 2009023354 A2 | 2/2009 |

\* cited by examiner

WING COMPRISING A LEADING EDGE SLAT AND HAVING MEANS FOR PREVENTING THE TRANSITION TO A TURBULENT BOUNDARY LAYER

CROSS-REFERENCES TO RELATED APPLICATIONS

This application claims the benefit of the French patent application No. 1760557 filed on Nov. 9, 2017, the entire disclosures of which are incorporated herein by way of reference.

BACKGROUND OF THE INVENTION

The present invention relates to a wing comprising a leading edge slat that is movable between a retracted position and a deployed position and comprising means for preventing the transition from a laminar boundary layer to a turbulent boundary layer, as well as to an aircraft comprising at least one such wing.

An aircraft wing comprises a fixed main part and a leading edge slat that is movable at the front of the main part and can be moved between a retracted position, in which it is adjoined to (abuts) the front of the main part and a deployed position, in which it is lifted from the main part. The leading edge slat allows, when it is in the deployed position, the angle of attack to be increased, particularly at low speed.

FIG. 5 shows a side and section view in a vertical plane of a wing 500 of the prior art. The wing 500 has a main part 502 and a leading edge slat 504, which is at the front of the main part 502 and which in this case is in the retracted position.

In the retracted position, the upstream stop line 506 is located in the vicinity of the leading edge of the leading edge slat 504 and the airflow separates either side of the upstream stop line 506 into an upper surface stream 508 and a lower surface stream 510, thus creating two boundary layers.

By its very structure, the leading edge slat 504 extends, on the one hand, alongside the upper surface of the main part 502 and, on the other hand, alongside the lower surface of the main part 502. The leading edge slat 504 has an upper surface rear edge or upper surface trailing edge 512, which, in the retracted position, is alongside an upper surface of the main part 502, and a lower surface rear edge or lower surface trailing edge 514, which, in the retracted position, is alongside a lower surface of the main part 502. Each of these edges 512 and 514 is of a certain thickness that tends to disrupt, as the case may be, the upper surface stream 508 or the lower surface stream 510.

Thus, for each of these edges 512 and 514, the airflow 508, 510 has a boundary layer having a laminar speed profile upstream of the edge 512, 514 and a boundary layer having a turbulent speed profile downstream of the edge 512, 514.

In order to avoid these disruptions, it is preferable for an architecture to be found that prevents the transition from a laminar boundary layer to a turbulent boundary layer.

SUMMARY OF THE INVENTION

An aim of the present invention is to propose a wing comprising a leading edge slat that is movable between a retracted position and a deployed position and comprising means for preventing the transition from a laminar boundary layer to a turbulent boundary layer.

To this end, a wing of an aircraft is proposed, the wing comprising:

a fixed main part;

a movable leading edge slat at the front of the main part between a retracted position, in which it is adjoined to (abuts) the front of the main part, and a deployed position, in which it is lifted towards the front of the main part, the leading edge slat has an upper surface rear edge, which, in the retracted position, is alongside an upper surface of the main part, and a lower surface rear edge, which, in the retracted position, is alongside a lower surface of the main part, the wing being characterized in that the main part has an upper surface wall, which, in the retracted position of the leading edge slat, comes downstream and in the alignment of the upper surface rear edge, and a lower surface wall, which, in the retracted position of the leading edge slat, comes downstream and in the alignment of the lower surface rear edge, in that the wing has, in the retracted position of the leading edge slat, an upper surface gap between the end of the upper surface rear edge of the leading edge slat and the end of the upper surface wall of the main part that are facing each other, and a lower surface gap between the end of the lower surface rear edge of the leading edge slat and the end of the lower surface wall of the main part that are facing each other, in that the wing has an upper surface channel downstream of the upper surface gap and a lower surface channel downstream of the lower surface gap, and in that the wing comprises a suction system connected to each channel and arranged to suck the air contained in the channel.

Such an architecture allows suction of the air in the vicinity of each rear edge of the leading edge slat and thus allows the transition from the laminar boundary layer to a turbulent boundary layer to be prevented.

Advantageously, the wing comprises an upper surface seal, which, in the retracted position, is positioned between the main part and the leading edge slat in the vicinity of and upstream of the upper surface gap, and the wing comprises a lower surface seal, which, in the retracted position, is positioned between the main part and the leading edge slat in the vicinity of and upstream of the lower surface gap.

According to a particular embodiment, the leading edge slat comprises, in the extension of at least one of the rear edges thereof, a plurality of teeth, each of which extends from the rear edge and, in the retracted position, up to the end of the wall of the facing main part.

According to a particular embodiment, the end of at least one wall that is facing a rear edge of the leading edge slat assumes a castellated shape and the rear edge assumes a substantially complementary castellated shape and it comprises a plurality of teeth, each of which extends from the rear edge and, in the retracted position, up to the end of the wall of the facing main part.

The invention also proposes an aircraft comprising at least one wing according to one of the preceding variations.

BRIEF DESCRIPTION OF THE DRAWINGS

The aforementioned features of the invention, as well as other features, will become more clearly apparent upon reading the following description of an example embodiment, the description being provided with reference to the accompanying drawings, in which.

DETAILED DESCRIPTION OF THE PREFERRED EMBODIMENTS

Figure 1:
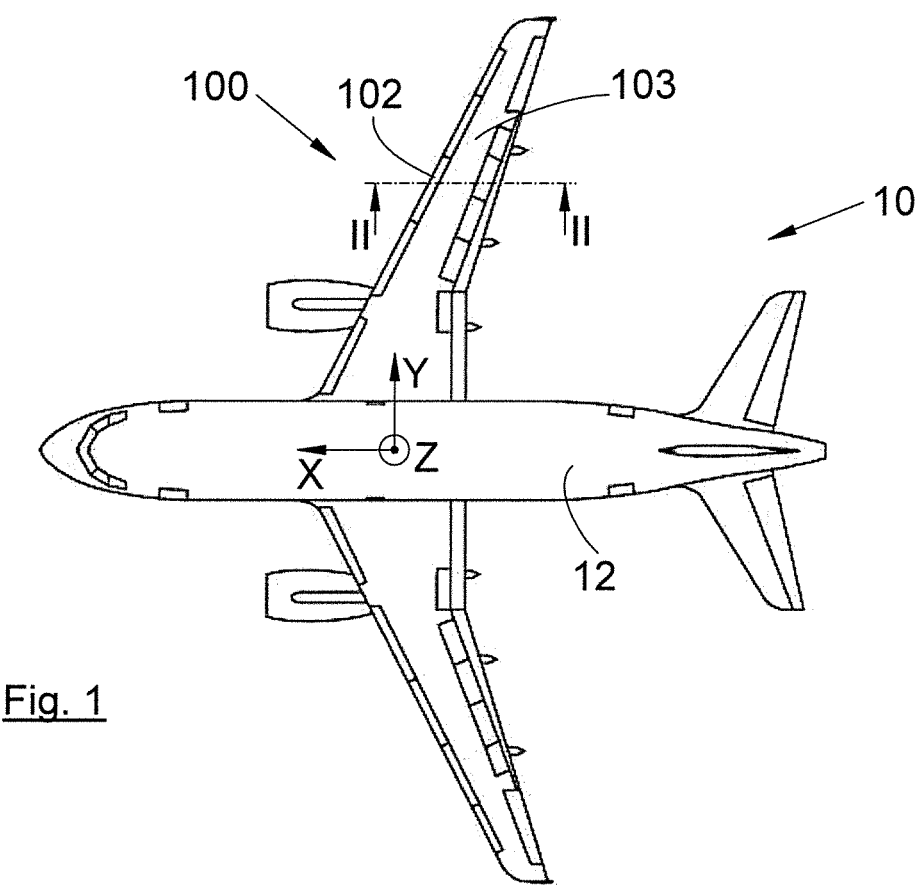
FIG. 1 shows a top view of an aircraft according to the invention.

FIG. 1 shows an aircraft 10 with a fuselage 12, on either side of which a wing 100 is fixed, which wing has a main part 103 fixed to the fuselage 12 and at least one leading edge slat 102, which is movable at the front of the main part 103 and which can be moved between a retracted position, in which it is adjoined to (abuts) the front of the main part 103, and a deployed position, in which it is lifted towards the front of the main part 103, that is, forwardly of the front of the main part.

Throughout the following description, by convention, the direction X corresponds to the longitudinal direction of the aircraft, with this direction being parallel to the longitudinal axis X of the aircraft. Furthermore, the direction Y corresponds to the direction transversely oriented relative to the aircraft and the direction Z corresponds to the vertical direction or height, with these three directions X, Y, Z being orthogonal to each other. The longitudinal axis X is oriented from the rear to the front of the aircraft 10.

Throughout the following description, the terms relating to a position are taken with reference to the normal forward movement of an aircraft.

Figure 2:
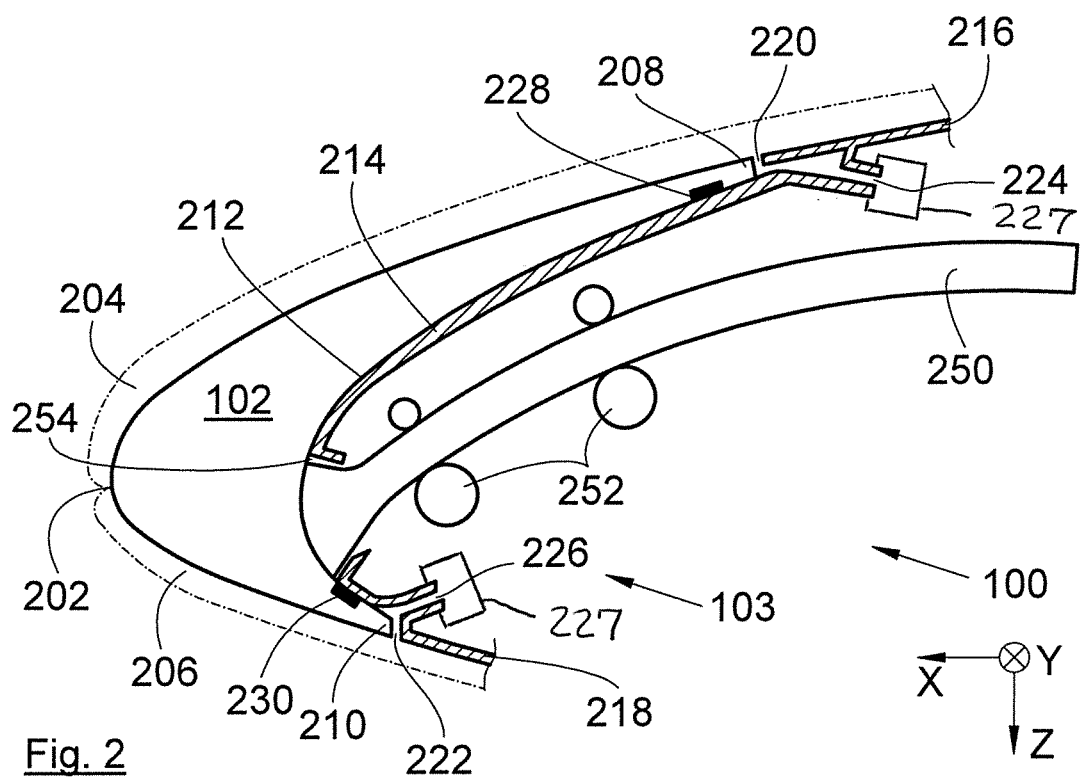
FIG. 2 shows a side and section view along the II-II line of a wing of FIG. 1.

FIG. 2 shows a section of the wing 100 having the main part 103 and the leading edge slat 102, which is at the front of the main part 103 and which in this case is in the retracted position.

In the retracted position, the upstream stop line 202 is located in the vicinity of the leading edge of the leading edge slat 102 and the airflow separates either side of the upstream stop line 202 into an upper surface stream 204 with a boundary layer and a lower surface stream 206 with a boundary layer.

In the embodiment of the invention shown in FIG. 2, the movement of the leading edge slat 102 between the retracted position and the deployed position, and vice versa, is provided by at least one actuator, at least one rail 250 and two pairs of rollers 252 for each rail 250. For each pair of rollers 252, the corresponding rail 250 is mounted between the two rollers 252 of the pair and its front part is fixed to the leading edge slat 102. When a movement of the leading edge slat 102 is required, the actuator or each actuator acts on the rail or on one of the rails 250 so as to move the rail in one direction or the other, while the rail 250 is guided by the rollers 252. The main part 103 assumes the form of a recessed casing, which allows the rails, the actuators and the rollers to be housed therein, and the main part 103 in this case has an opening 254 in the vicinity of its front part, which allows the passage of the rail or of each rail 250. Of course, another architecture is possible for controlling the movement of the leading edge slat 102.

As is the case for the prior art, the leading edge slat 102 extends, on the one hand, alongside the upper surface of the main part 103 and, on the other hand, alongside the lower surface of the main part 103. The leading edge slat 102 has an upper surface rear edge 208, which, in the retracted position, is alongside the upper surface of the main part 103, and a lower surface rear edge 210, which, in the retracted position, is alongside the lower surface of the main part 103. Each of these edges 208 and 210 has a certain thickness.

In the retracted position, the inner face 212 of the leading edge slat 102 is in abutment against an outer wall 214 of the main part 103.

The main part 103 has an upper surface wall 216, which, in the retracted position, extends downstream relative to the forward movement of the aircraft 10 and in alignment with the upper surface rear edge 208, and a lower surface wall 218, which, in the retracted position, extends downstream relative to the forward movement of the aircraft 10 and in alignment with the lower surface rear edge 210. In this document, downstream means in a direction of airflow as the aircraft 10 moves forward generally in the direction X.

In the retracted position, between the end of the upper surface rear edge 208 and the end of the upper surface wall 216, which are facing each other, the wing 100 has an upper surface gap 220. In the retracted position, between the end of the lower surface rear edge 210 and the end of the lower surface wall 218, which are facing each other, the wing 100 has a lower surface gap 222.

The upper surface rear edge 208 and the end of the upper surface wall 216 are arranged to be flush with each other in the retracted position, within manufacturing tolerances, and, in the same way, the lower surface rear edge 210 and the end of the lower surface wall 218 are arranged to be flush with each other in the retracted position, within manufacturing tolerances.

According to one particular embodiment, the width of each gap 220, 222 is approximately 10 μm to several tens of millimeters.

Downstream of the upper surface gap 220, the wing 100 has an upper surface channel 224 and downstream of the lower surface gap 222, the wing 100 has a lower surface channel 226.

Each channel 224, 226 runs inside the main part 103 and is fluidly connected to a suction system 227 of the wing 100 that is arranged to suck the air contained in the channel 224, 226 and, consequently, the external air in the vicinity of the gap 220, 222.

The suction of the air allows the boundary layer to be controlled by reducing the disruptions in the vicinity of the gap 220, 222, and thus allows a laminar stream to be maintained in the vicinity of the passage of the leading edge slat 102 on the main part 103.

The suction system 227 can be a dedicated suction pump or a low pressure zone of the turboshaft engine of the aircraft 10. The suction system 227 can be formed by a single suction pump for the two channels 224 and 226 or by one suction pump per channel 224, 226.

In order to provide good air suction in the vicinity of the upper surface gap 220 and to avoid air leaks between the main part 103 and the leading edge slat 102, the wing 100 comprises an upper surface seal 228, which, in the retracted position, is positioned between the main part 103 and the leading edge slat 102 in the vicinity of and upstream of the upper surface gap 220. In the example shown in FIG. 2, the upper surface seal 228 is rigidly connected to the inner face 212 of the leading edge slat 102 and comes into abutment against the outer wall 214 of the main part 103. According to one variation, the upper surface seal 228 is rigidly connected to the outer wall 214 of the main part 103 and comes into abutment against the inner face 212 of the leading edge slat 102.

Similarly, in order to provide good air suction in the vicinity of the lower surface gap 222 and to avoid air leaks between the main part 103 and the leading edge slat 102, the wing 100 comprises a lower surface seal 230, which, in the retracted position, is positioned between the main part 103 and the leading edge slat 102 in the vicinity of and upstream of the lower surface gap 222. In this case, the lower surface seal 230 is rigidly connected to the inner face 212 of the leading edge slat 102 and comes into abutment against the outer wall 214 of the main part 103. According to one variation, the lower surface seal 230 is rigidly connected to the outer wall 214 of the main part 103 and comes into abutment against the inner face 212 of the leading edge slat 102.

Figure 3:
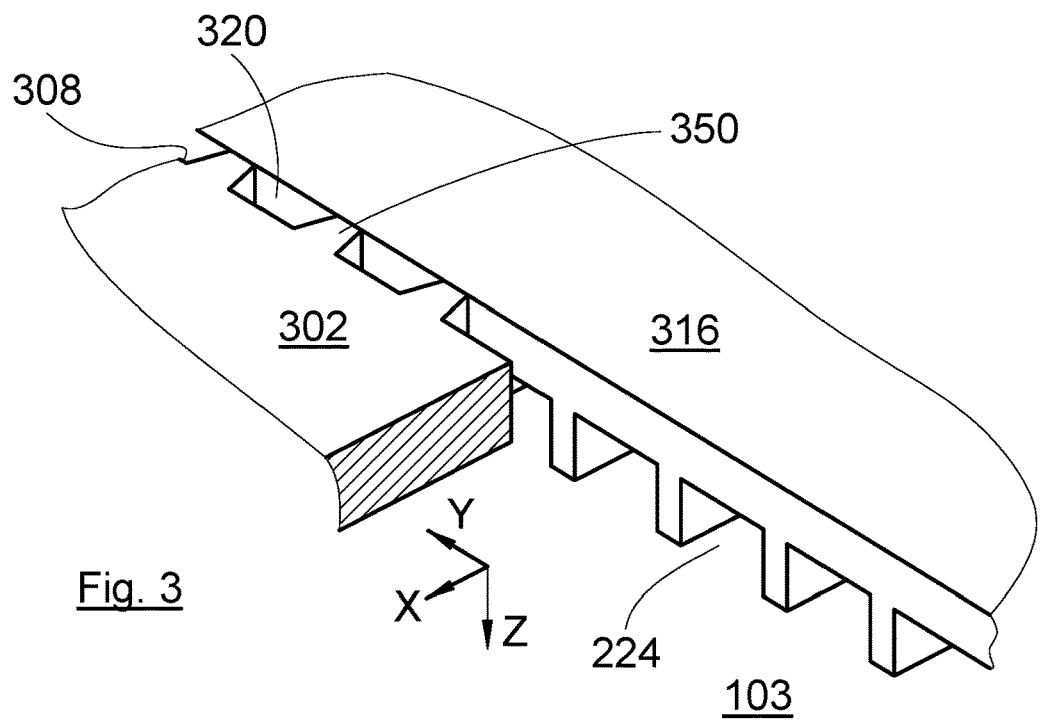
FIG. 3 shows a perspective view of a first embodiment of the invention.

FIG. 3 shows a first embodiment of the invention in the vicinity of the upper surface of the wing 100, but it can be similarly applied to the lower surface.

In FIG. 3, part of the leading edge slat 302 has been cut to reveal the upper surface channel 224 of the main part 103.

In order to guarantee, in the retracted position, the positioning of the leading edge slat 302 relative to the upper surface wall 316, and therefore the suction surface in the vicinity of the upper surface gap 320, the leading edge slat 302 comprises, in the extension of the upper surface rear edge 308, a plurality of teeth 350, each of which extends from the upper surface rear edge 308 up to the end of the upper surface wall 316 of the facing main part 103. In the retracted position, each tooth 350 comes into abutment against the end of the upper surface wall 316 and thus prevents the closure of the upper surface gap 320.

Figure 4:
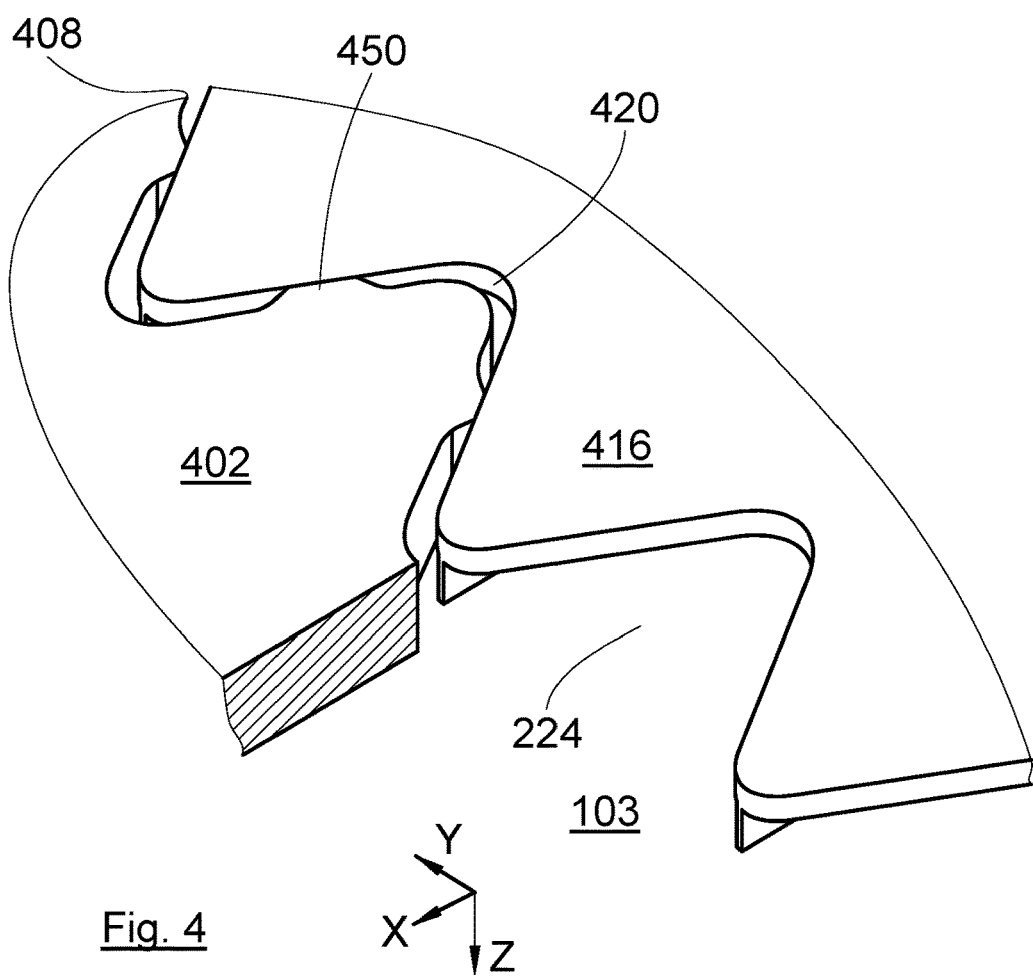
FIG. 4 shows a perspective view of a second embodiment of the invention.
Figure 5:
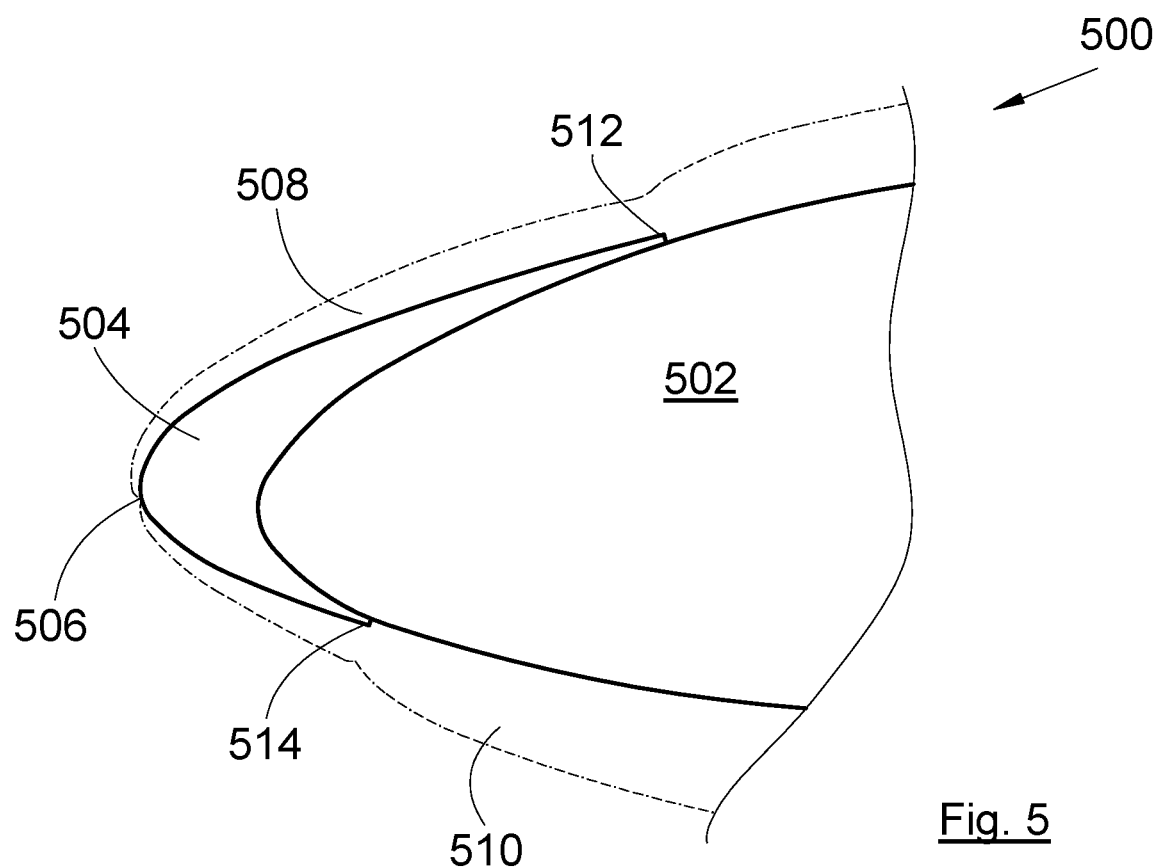
FIG. 5 shows a side and section view of a wing of the prior art.

FIG. 4 shows a second embodiment of the invention in the vicinity of the upper surface of the wing 100, but it can be similarly applied to the lower surface.

In FIG. 4, part of the leading edge slat 402 has been cut to reveal the upper surface channel 224 of the main part 103.

In order to guarantee, in the retracted position, the positioning of the leading edge slat 402 relative to the upper surface wall 416, and therefore the suction surface in the vicinity of the upper surface gap 420, the end of the upper surface wall 416 of the main part 103 that is facing the upper surface rear edge 408 of the leading edge slat 402 assumes a castellated shape, which in this case is generally sinusoidal, and the upper surface rear edge 408 assumes a substantially complementary castellated shape, except in that it comprises a plurality of teeth 450, each of which extends from the upper surface rear edge 408 up to the end of the upper surface wall 416 of the facing main part 103. In the retracted position, each tooth 450 comes into abutment against the upper surface wall 416 and thus prevents the closure of the upper surface gap 420.

Furthermore, the castellated shapes prevent the presence of a wall perpendicular to the airflow, which could appear due to geometrical dispersions or deformations in flight.

The invention has been described on the basis of a movable leading edge slat in the retracted position. By way of a variation, the invention can be implemented on an attached leading edge, as long as an upper surface gap and/or a lower surface gap is created.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing of an aircraft, said wing comprising:
    a fixed main part;
    a movable leading edge slat at a front of the main part between a retracted position, in which the leading edge slat is adjoined to the front of the main part, and a deployed position, in which the leading edge slat is lifted forwardly of the front of the main part,
        the leading edge slat having an upper surface rear edge, which, in the retracted position, is alongside an upper surface of the main part, and a lower surface rear edge, which, in the retracted position, is alongside a lower surface of the main part,
        the wing main part comprising an upper surface wall, which, in the retracted position of the leading edge slat, extends downstream and in alignment with the upper surface rear edge, and a lower surface wall, which, in the retracted position of the leading edge slat, extends downstream and in alignment with the lower surface rear edge,
    wherein the wing has, in the retracted position of the leading edge slat, an upper surface gap between an end of the upper surface rear edge of the leading edge slat and an end of the upper surface wall of the main part that are facing each other, and a lower surface gap between an end of the lower surface rear edge of the leading edge slat and an end of the lower surface wall of the main part that are facing each other,
    wherein the wing has an upper surface channel downstream of the upper surface gap and a lower surface channel downstream of the lower surface gap, and
    wherein the wing comprises a suction system connected to each channel and arranged to suck air contained in said channel, the suction system arranged inside the main part.

2. The wing according to claim 1,
    wherein the wing comprises an upper surface seal, which, in the retracted position, is positioned between the main part and the leading edge slat in a vicinity of and upstream of the upper surface gap, and
    wherein the wing comprises a lower surface seal, which, in the retracted position, is positioned between the main part and the leading edge slat in a vicinity of and upstream of the lower surface gap.

3. The wing according to claim 1, wherein the leading edge slat comprises, in an extension of at least one of the rear edges thereof, a plurality of teeth, each of which extends from said rear edge and, in the retracted position, up to the end of the wall of the facing main part.

4. The wing according to claim 1, wherein the end of at least one wall that is facing a rear edge of the leading edge slat assumes a castellated shape and the rear edge assumes a substantially complementary castellated shape and the leading edge slat comprises a plurality of teeth, each of which extends from said rear edge and, in the retracted position, up to the end of the wall of the facing main part.

5. An aircraft comprising at least one wing according to claim 1.

6. The wing according to claim 1, wherein the suction system is formed by one suction pump for each channel.

7. The wing according to claim 1, wherein the suction system is formed by a single suction pump for the upper surface channel and the lower surface channel.

8. The wing according to claim 1, wherein the suction system is a pressure zone of a turboshaft engine of the aircraft.

9. A wing of an aircraft, comprising:
a fixed main part;
a leading edge slat positioned at a front of the main part movable between a retracted position, in which the leading edge slat abuts the front of the main part, and a deployed position, in which the leading edge slat is lifted forwardly of the front of the main part,
the leading edge slat having an upper surface rear edge, which, in the retracted position, is positioned alongside an upper surface of the main part, and a lower surface rear edge, which, in the retracted position, is positioned alongside a lower surface of the main part,
the wing main part comprising an upper surface wall, which, in the retracted position of the leading edge slat, extends downstream and in alignment with the upper surface rear edge, and a lower surface wall, which, in the retracted position of the leading edge slat, extends downstream and in alignment with the lower surface rear edge,
wherein the wing has, in the retracted position of the leading edge slat, an upper surface gap between an end of the upper surface rear edge of the leading edge slat which faces an end of the upper surface wall of the main part, and a lower surface gap between an end of the lower surface rear edge of the leading edge slat which faces an end of the lower surface wall of the main part,
wherein the wing has an upper surface channel downstream of the upper surface gap and a lower surface channel downstream of the lower surface gap, and
wherein the wing comprises a suction system connected to each channel and arranged to suck air contained in said channels, the suction system arranged inside the main part.

10. The wing according to claim 9,
wherein the wing comprises an upper surface seal, which, in the retracted position, is positioned between the main part and the leading edge slat in a vicinity of and upstream of the upper surface gap, and
wherein the wing comprises a lower surface seal, which, in the retracted position, is positioned between the main part and the leading edge slat in a vicinity of and upstream of the lower surface gap.

11. The wing according to claim 9, wherein the leading edge slat comprises, in an extension of at least one of the rear edges thereof, a plurality of teeth, each of which extends from said at least one rear edge and, in the retracted position, up to the end of the wall of the facing main part.

12. The wing according to claim 9, wherein the end of at least one wall that is facing a rear edge of the leading edge slat assumes a castellated shape and the rear edge assumes a substantially complementary castellated shape and the leading edge slat comprises a plurality of teeth, each of which extends from said rear edge and, in the retracted position, up to the end of the wall of the facing main part.

13. An aircraft comprising at least one wing according to claim 9.

14. The wing according to claim 9, wherein the suction system is formed by one suction pump for each channel.

15. The wing according to claim 9, wherein the suction system is formed by a single suction pump for the upper surface channel and the lower surface channel.

16. The wing according to claim 6, wherein the suction system is a pressure zone of a turboshaft engine of the aircraft.

* * * * *